US012651914B2

(12) United States Patent
Fukuchi et al.

(10) Patent No.: US 12,651,914 B2
(45) Date of Patent: Jun. 9, 2026

(54) VOLTAGE DETECTION CIRCUIT, CHARGE CONTROL CIRCUIT, CHARGE AND DISCHARGE CONTROL CIRCUIT, AND SEMICONDUCTOR DEVICE

(71) Applicant: ABLIC Inc., Tokyo (JP)

(72) Inventors: Shinya Fukuchi, Tokyo (JP); Yasuhiro Miyamoto, Tokyo (JP); Keiichi Murakawa, Tokyo (JP)

(73) Assignee: ABLIC Inc., Nagano (JP)

( * ) Notice: Subject to any disclaimer, the term of this patent is extended or adjusted under 35 U.S.C. 154(b) by 703 days.

(21) Appl. No.: 18/185,377

(22) Filed: Mar. 17, 2023

(65) Prior Publication Data

US 2023/0318315 A1 Oct. 5, 2023

(30) Foreign Application Priority Data

Mar. 29, 2022 (JP) ................................. 2022-053650
Nov. 29, 2022 (JP) ................................. 2022-190306

(51) Int. Cl.
*H02J 7/50* (2026.01)
*H02J 7/62* (2026.01)
*H02J 7/64* (2026.01)

(52) U.S. Cl.
CPC ...................................... *H02J 7/50* (2026.01);
*H02J 7/62* (2026.01); *H02J 7/64* (2026.01)

(58) Field of Classification Search
CPC ........................................................ H02J 7/50
USPC ........................................................ 320/128
See application file for complete search history.

(56) References Cited

U.S. PATENT DOCUMENTS

| | | | | |
|---|---|---|---|---|
| 5,493,197 A | * | 2/1996 | Eguchi .................. | H02J 7/0031 |
| | | | | 320/134 |
| 8,148,946 B2 | * | 4/2012 | Takeda ................ | H01M 10/486 |
| | | | | 320/155 |
| 2012/0206105 A1 | * | 8/2012 | Nishizawa .......... | H01M 10/482 |
| | | | | 320/134 |
| 2016/0134274 A1 | * | 5/2016 | Takemura ............ | H03K 17/223 |
| | | | | 327/143 |
| 2018/0269705 A1 | * | 9/2018 | Saito ................... | H02J 7/00712 |
| 2019/0173297 A1 | * | 6/2019 | Maetani ............... | G01R 31/382 |
| 2021/0242690 A1 | * | 8/2021 | Okamoto ........... | H10D 30/6755 |
| 2022/0006309 A1 | * | 1/2022 | Takahashi .......... | H02J 7/00304 |
| 2022/0052387 A1 | * | 2/2022 | Takahashi ............... | H02J 7/005 |
| 2022/0094177 A1 | * | 3/2022 | Okamoto .............. | H01M 10/44 |
| 2022/0294402 A1 | * | 9/2022 | Takahashi ................ | H03K 5/08 |

FOREIGN PATENT DOCUMENTS

JP 2020010536 1/2020

\* cited by examiner

*Primary Examiner* — Jerry D Robbins
(74) *Attorney, Agent, or Firm* — JCIPRNET

(57) ABSTRACT

A voltage detection circuit, a charge control circuit, a charge and discharge control circuit, and a semiconductor device are provided. The voltage detection circuit includes: an input port; a plurality of transistors connected in series and including at least an input transistor including a gate connected to the input port, a source connected to a first power supply terminal, and a drain, and a first transistor including a drain connected to a second power supply terminal, a gate, and a source connected to the gate of the first transistor; and an output port configured to be one of connection points of the plurality of transistors.

19 Claims, 8 Drawing Sheets

VOLTAGE DETECTION CIRCUIT, CHARGE CONTROL CIRCUIT, CHARGE AND DISCHARGE CONTROL CIRCUIT, AND SEMICONDUCTOR DEVICE

CROSS-REFERENCE TO RELATED APPLICATION

This application claims the priority benefit of Japan application serial no. 2022-053650, filed on Mar. 29, 2022 and Japan application serial no. 2022-190306, filed on Nov. 29, 2022. The entirety of the above-mentioned patent applications is hereby incorporated by reference herein and made a part of this specification.

BACKGROUND

Technical Field

The present invention relates to a voltage detection circuit, a charge control circuit, a charge and discharge control circuit, and a semiconductor device.

Description of Related Art

From the viewpoint of obtaining a higher voltage, a battery device incorporating a secondary battery including a plurality of serially connected battery cells (hereinafter, referred to using "multi-cell") is sometimes applied. In a voltage detection circuit which detects a voltage between intermediate terminals in a circuit to which a multi-cell secondary battery is connected, when the intermediate terminal is shorted, that is, short-circuited or grounded to a power supply terminal or a ground terminal, a voltage higher than that of a battery device incorporating a secondary battery including a single battery cell is applied to the intermediate terminal. A charge and discharge control circuit which includes a voltage detection circuit including a comparator for detecting short-circuiting or grounding at an intermediate terminal as an abnormality during charge and discharge is known (refer to, for example, Japanese Patent Laid-Open No. 2020-10536).

In a circuit to which a conventional multi-cell secondary battery is connected, for example, when short-circuiting (short circuit with a power supply terminal) occurs at an intermediate terminal, a signal level of an output signal of the comparator which detects an abnormal state such as a short-circuiting is inverted, for example, from a low (hereinafter, referred to as "L") level to a high (hereinafter, referred to as "H") level. That is, the voltage detection circuit can detect whether or not short-circuiting has occurred based on the signal level of the output signal of the comparator. A withstand voltage of a constituent element of the comparator, such as a transistor, which receives a voltage from the intermediate terminal is determined in consideration of a voltage of the secondary battery. This is because, when a path which connects positive terminals and intermediate terminals of n battery cells is short-circuited, a voltage obtained by connecting n battery cells in series is applied to the constituent element of the comparator connected to the short-circuited intermediate terminal.

The withstand voltage of the constituent element is determined in consideration of the level of the voltage of the secondary battery, that is, whether n is great or small, and as the number of battery cells increases, the withstand voltage increases. A semiconductor element such as a transistor has a disadvantage that an area of the voltage detection circuit increases as the number of battery cells increases because an area of the element increases as the withstand voltage increases. In addition, since it is necessary to increase a channel length (an L length) in order to achieve low power consumption while ensuring the withstand voltage, the tendency for the area of the circuit to increase becomes noticeable.

SUMMARY

A voltage detection circuit according to an aspect of the present invention includes an input port, a plurality of transistors connected in series and including at least an input transistor including a gate connected to the input port, a source connected to a first power supply terminal, and a drain, and a first transistor including a drain connected to a second power supply terminal, a gate, and a source connected to the gate of the first transistor, and an output port configured to be one of connection points of the plurality of transistors.

According to the voltage detection circuit, the charge control circuit, the charge and discharge control circuit, and the semiconductor device, it is possible to suppress an increase in an area of the voltage detection circuit connected to the secondary battery including multi-cells due to an increase in the number of cells.

DESCRIPTION OF THE EMBODIMENTS

Embodiments of the present invention provide a voltage detection circuit, a charge control circuit, a charge and discharge control circuit, and a semiconductor device in which increase in an area of the voltage detection circuit connected to a multi-cell secondary battery can be curbed.

A voltage detection circuit, a charge control circuit, a charge and discharge control circuit, and a semiconductor device according to embodiments of the present invention will be described below with reference to the drawings.

First Embodiment

Figure 1:
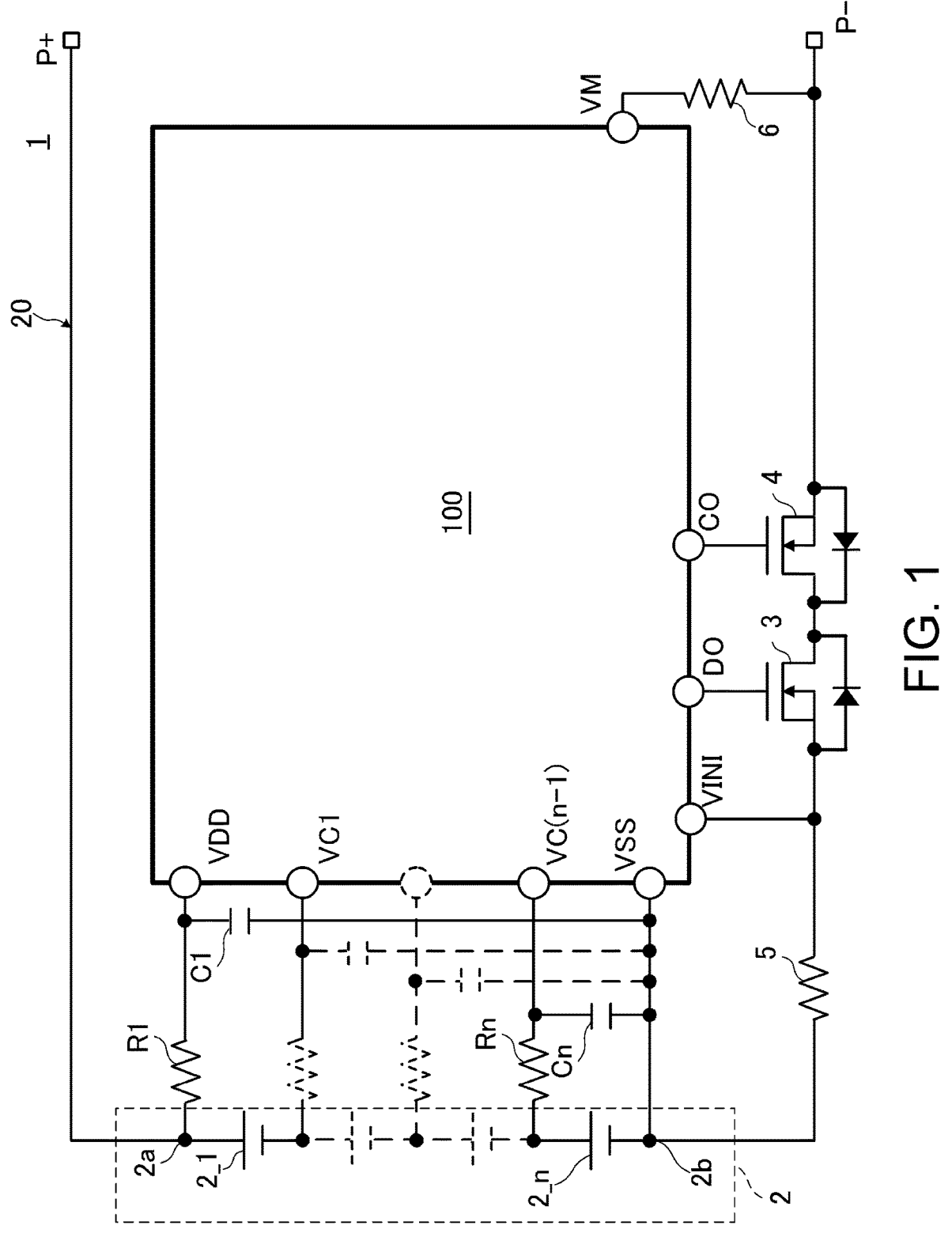
FIG. 1 is a schematic diagram illustrating one configuration example of a charge and discharge control circuit and a semiconductor device according to a first embodiment of the present invention.

FIG. 1 is a block diagram illustrating a circuit configuration of a battery device 1 which is an example of a semiconductor device according to a first embodiment of the present invention.

The battery device 1 includes a semiconductor integrated circuit formed on a semiconductor substrate by a semiconductor process, specifically an IC chip including a charge and discharge control circuit 100 for controlling charge and discharge of a secondary battery 2.

Each of the battery device 1 and the charge and discharge control circuit 100 is one example of the semiconductor device and the charge and discharge control circuit according to the first embodiment. The battery device 1 includes the secondary battery 2 including a so-called battery pack having a multi-cell configuration, an external positive terminal P+, an external negative terminal P−, a discharge control field effect transistor (FET) 3, a charge control FET 4, and the charge and discharge control circuit 100 for controlling charge and discharge of the secondary battery 2.

The secondary battery 2 is a so-called multi-cell battery including a battery pack in which n battery cells (hereinafter, simply referred to as "cells") 2_1 to 2_$n$ are connected in series, when n is the number of cells connected in series. In the case of the multi-cell battery, n is a natural number greater than or equal to 2, that is, a plurality. The n cells 2_1, . . . , 2_$n$ are connected in series from a positive electrode 2$a$ of the secondary battery 2 toward a negative electrode 2$b$ of the secondary battery 2 in this order.

A charge and discharge control device 20 includes an external positive terminal P+, an external negative terminal P−, a discharge control FET 3, a charge control FET 4, and a charge and discharge control circuit 100. That is, the charge and discharge control device 20 as a semiconductor device is a device in which the secondary battery 2 is omitted from the battery device 1.

The external positive terminal P+ and the external negative terminal P− are terminals for connecting to external devices (not illustrated) such as a charger and a load. In the battery device 1, for example, the secondary battery 2, an overcurrent detection resistor 5, the discharge control FET 3, and the charge control FET 4 are connected in this order from the external positive terminal P+ side to a path which connects the external positive terminal P+ to the external negative terminal P− (hereinafter, referred to as a "path between external terminals").

The battery device 1 and the charge and discharge control device 20 include the discharge control FET 3 and the charge control FET 4 on the external negative terminal P− side, that is, on the low side. Both the discharge control FET 3 and the charge control FET 4 are NMOS transistors, and drains thereof are connected to each other.

The discharge control FET 3 includes a gate connected to a discharge control signal output port DO, a drain as one end connected to the drain of the charge control FET 4, and a source as the other end connected to one end of the overcurrent detection resistor 5.

The charge control FET 4 includes a gate connected to a charge control signal output port CO, a source as one end connected to the external negative terminal P−, and a drain as the other end connected to the drain of the discharge control FET 3.

The charge and discharge control circuit 100 includes a positive power supply input port VDD, a negative power supply input port VSS, cell connection terminals VC1, . . . , VC(n−1), the charge control signal output port CO, the discharge control signal output port DO, an external negative voltage input port VM, and an overcurrent detection terminal VINI, The positive power supply input port VDD as a power supply input port is connected to the positive electrode 2$a$ via a resistor R1, and is supplied with a voltage from the positive electrode 2$a$ of the secondary battery 2. The negative power supply input port VSS which is a power supply input port different from the positive power supply input port VDD is connected to the negative electrode 2$b$, and is supplied with a voltage from the negative electrode 2$b$.

The cell connection terminal VC1 is connected to contact points of the first cell 2_1 and the second cell 2_2, that is, a negative terminal of the first cell 2_1 and a positive terminal of the second cell 2_2 via a resistor R2. In the following, similarly to the cell connection terminal VC1, each of the cell connection terminals VC2, . . . , VC(n−1) is connected to the negative terminal of the second cell 2_2, the positive terminal of the third cell 2_3, . . . , the negative terminal of the n−1th cell 2_(n−1), and the positive terminal of the n-th cell 2_$n$ via resistors R3, . . . , Rn.

Here, ends of the resistors R1, . . . , Rn connected to the first cell 2_1 to the n-th cell 2_$n$ (left ends in FIG. 1) are referred to as first ends, and ends connected to the positive power supply input port VDD, the cell connection terminals VC1, . . . , VC(n−1) and the negative power supply input port VSS, that is, the ends opposite to the first ends are referred to as second ends (right ends in FIG. 1).

A capacitor C1 for suppressing voltage fluctuation is connected between a contact point between the second end of the resistor R1 and the positive power supply input port VDD and a contact point between the negative electrode 2$b$ and the negative power supply input port VSS. In the following, similarly to the capacitor C1, capacitors C2, . . . , Cn are respectively connected between the contacts between the second ends of the resistors R2, . . . , Rn and the cell connection terminals VC1, . . . , VC(n−1) and the contacts between the negative electrode 2$b$ and the negative power supply input port VSS.

The charge control signal output port CO is a terminal which outputs a charge control signal generated in the charge and discharge control circuit 100 for controlling stop and permission of the charge of the secondary battery 2 to the outside of the charge and discharge control circuit 100. The charge control signal output port CO is connected to the gate of the charge control FET 4.

The discharge control signal output port DO is a terminal which outputs a discharge control signal generated in the charge and discharge control circuit 100 for controlling stop and permission of the discharge of the secondary battery 2 to the outside of the charge and discharge control circuit 100. The discharge control signal output port DO is connected to the gate of the discharge control FET 3.

The external negative voltage input port VM is connected via a resistor 6 to the external negative terminal P− and the source of the charge control FET 4.

The overcurrent detection terminal VINI is connected to one end of the overcurrent detection resistor 5 and the source of the discharge control FET 3.

Figure 2:
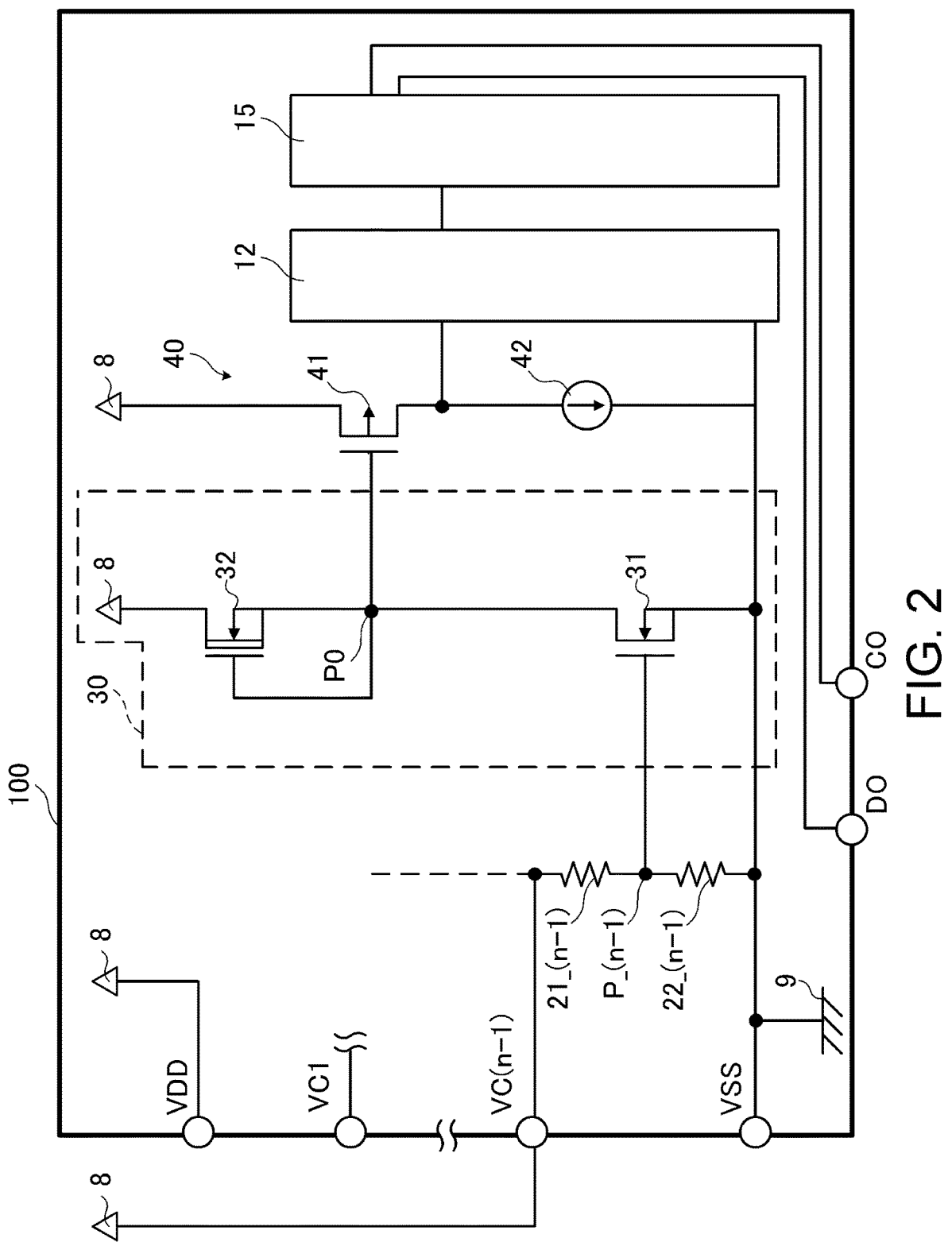
FIG. 2 is a circuit diagram schematically illustrating a main configuration of a voltage detection circuit according to the first embodiment and the charge and discharge control circuit according to the first embodiment including the voltage detection circuit.

FIG. 2 is a circuit diagram schematically illustrating the main configuration of the charge and discharge control circuit 100 which is an example of the charge and discharge control circuit according to the present embodiment.

The charge and discharge control circuit 100 is configured to be connectable to the secondary battery 2 (refer to FIG. 1) including n battery cells 2_1 to 2_n connected in series (refer to FIG. 1). FIG. 2 illustrates the final-stage voltage detection circuit 30 and level shifter 40 connected to the last battery cell from the positive electrode side to the negative electrode side of the secondary battery 2.

The charge and discharge control circuit 100 includes the voltage detection circuit 30, the level shifter 40, an overvoltage determination circuit 12 and a control circuit 15. The voltage detection circuit 30 and the level shifter 40 are configured using MOS transistors which are an example of the field effect transistors (hereinafter, referred to as "FETs"), as transistors.

The voltage detection circuit 30 includes an input port which receives a voltage to be detected, an enhancement type NMOS transistor 31 and a depletion type NMOS transistor 32 which are a plurality of transistors connected in series between the positive power supply input port VDD and the negative power supply terminal VSS, and an output port which is a connection point P0 of the NMOS transistor 31 and the NMOS transistor 32. Each of the NMOS transistor 31 and the NMOS transistor 32 has a sufficient withstand voltage which allows an operation even when a voltage corresponding to the voltage of the secondary battery 2 is applied. The level shifter 40 includes an enhancement type PMOS transistor 41 and a constant current source 42.

The input port of the voltage detection circuit 30 is a connection point P_(n−1) of a resistor 21_(n−1) and a resistor 22_(n−1) connected in series between the positive electrode and the negative electrode of one battery cell. The NMOS transistor 31 as an input transistor includes a gate connected to the connection point P_(n−1) as an input port of the voltage detection circuit 30, a source connected to the negative power supply input port VSS, and a drain. The negative power supply input port VSS is connected to a power supply terminal 9 to which a voltage Vss which is a power supply voltage is supplied. The NMOS transistor 32 as a first transistor includes a drain connected to a power supply terminal 8 to which a voltage Vdd which is a power supply voltage different from the voltage Vss is supplied, a gate, and a source connected with its own gate. A connection point P0 of the drain of the NMOS transistor 31 and the source of the NMOS transistor 32 is connected to the gate of the PMOS transistor 41.

The PMOS transistor 41 includes a source connected to the power supply terminal 8, a gate connected to the drain of the NMOS transistor 31 and the source of the NMOS transistor 32, that is, the connection point P0, and a drain. The constant current source 42 includes a first end connected to the drain of the PMOS transistor 41 and a second end connected to the negative power supply input port VSS. The second end of the constant current source 42 and a connection point between the drain of the PMOS transistor 41 and the first end of the constant current source 42 are connected to the overvoltage determination circuit 12 at the subsequent stage.

The overvoltage determination circuit 12 has a function of determining whether each of the cells 2_1, . . . , 2_n has overvoltage based on a voltage received at both ends. When the overvoltage determination circuit 12 receives a voltage of the negative power supply input port VSS and a voltage of the drain of the PMOS transistor 41, it is determined whether or not each of the cells 2_1, . . . 2_n has overvoltage. A determination result of the overvoltage determination circuit 12 is transmitted from the overvoltage determination circuit 12 to the control circuit 15.

The control circuit 15 is configured to be capable of outputting a control signal for switching between ON and OFF of the transistor to the charge control signal output port CO or the discharge control signal output port DO according to signals received from other circuits including circuits other than the overvoltage determination circuit 12, such as an overdischarge detection circuit and an overcharge detection circuit (not illustrated).

Next, an operation of the voltage detection circuit 30 and the charge and discharge control circuit 100 will be described by taking as an example, a case in which the highest voltage is applied to the voltage detection circuit 30, specifically, a case in which the cell connection terminal VC(n−1) is short-circuited (shorted to the power supply terminal 8).

The NMOS transistor 31 is turned off in a normal state before the cell connection terminal VC(n−1) is short-circuited. A voltage at the connection point P0 which is the output port of the voltage detection circuit 30 corresponds to a signal indicating the voltage detection result (hereinafter, simply referred to as an "output signal"), and is at the H level in the normal state.

When the cell connection terminal VC(n−1) is short-circuited, a voltage Vdd of the power supply terminal 8, that is, a voltage corresponding to the voltage of the secondary battery 2 is applied to the gate of the NMOS transistor 31. Since a voltage between the gate and the source of the NMOS transistor 31 exceeds a threshold voltage, the NMOS transistor 31 is turned on and becomes conductive. When the NMOS transistor 31 is turned on, the signal level of the output signal of the voltage detection circuit 30 transitions from the H level to the L level.

When the output signal of voltage detection circuit 30 is received, the level shifter 40 shifts the voltage level and outputs the shifted voltage level to the overvoltage determination circuit 12. The overvoltage determination circuit 12 determines whether or not the cell 2_n has overvoltage based on the voltage received from the voltage detection circuit 30 via the level shifter 40, and transmits a signal corresponding to the determination result to the control circuit 15. The control circuit 15 supplies a control signal for switching between ON and OFF of the charge control FET 4 to the charge control signal output port CO, and supplies a control signal for switching between ON and OFF of the discharge control FET 3 to the discharge control signal output port DO based on the signal corresponding to the received determination result.

According to the voltage detection circuit 30 configured as described above, the charge and discharge control circuit 100 including the voltage detection circuit 30, the charge and discharge control device 20, and the battery device 1, the number of elements can be reduced to two, which is less than the number of elements in a voltage detection circuit including a conventional comparator. Thus, even when areas of the individual elements are about the same, the total area of the voltage detection circuit 30 can be reduced. In other words, the voltage detection circuit 30 which has the same area as the voltage detection circuit including the conventional comparator can be applied to the secondary battery 2 having a higher voltage, that is, the secondary battery 2 including a large number n of battery cells 2_1 to 2_n connected in series.

Second Embodiment

Figure 3:
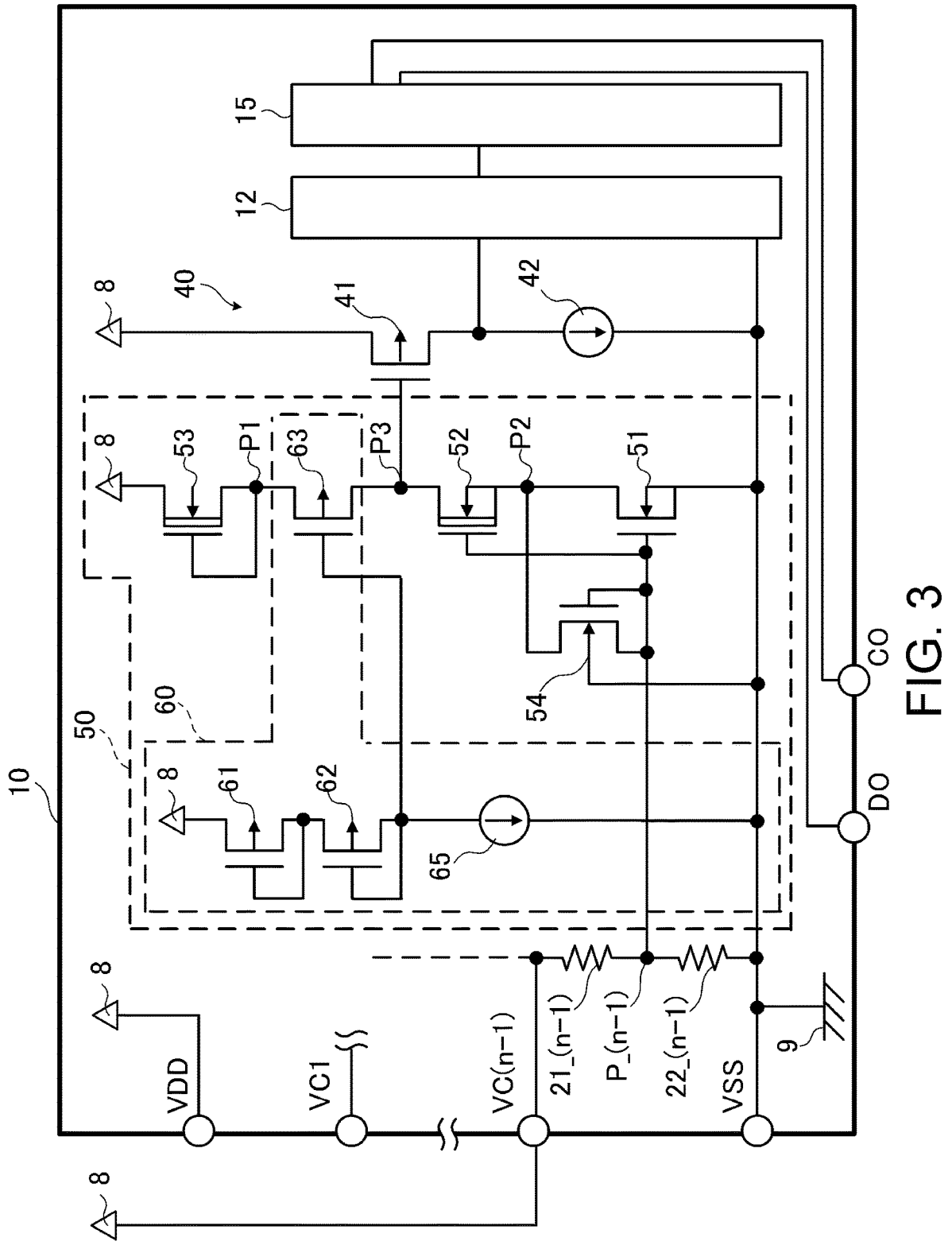
FIG. 3 is a circuit diagram schematically illustrating a main configuration of a voltage detection circuit according to a second embodiment of the present invention.

FIG. 3 is a circuit diagram schematically illustrating a main configuration of a voltage detection circuit 50 which is an example of a voltage detection circuit according to a second embodiment.

A semiconductor device, a charge and discharge control circuit, and a voltage detection circuit according to the second embodiment are different from the semiconductor device, the charge and discharge control circuit, and the voltage detection circuit according to the first embodiment in that the configuration of the voltage detection circuit is different, but there is no substantial difference in other respects. Thus, in the description of the present embodiment, the voltage detection circuit 50 which is different from the voltage detection circuit 30 will be mainly described, and other components which are substantially the same will be denoted by the same reference numerals, and redundant description will be omitted.

A charge and discharge control circuit 10 is an example of the charge and discharge control circuit according to the second embodiment. The charge and discharge control circuit 10 is different from the charge and discharge control circuit 100 (refer to FIGS. 1 and 2) in that it includes a voltage detection circuit 50 instead of the voltage detection circuit 30 (refer to FIG. 2), but there is no substantial difference in other respects. Thus, in the description of the charge and discharge control circuit 10, the voltage detection circuit 50 will be mainly described, and components other than the voltage detection circuit 30, such as the level shifter 40 (refer to FIG. 2), which are not substantially different from the charge and discharge control circuit 100, are denoted by the same reference numerals, and descriptions thereof will be simplified or omitted.

The charge and discharge control circuit 10 includes the voltage detection circuit 50 which is an example of the voltage detection circuit according to the second embodiment, a level shifter 40, an overvoltage determination circuit 12, and a control circuit 15. The voltage detection circuit 50 includes an enhancement type NMOS transistor 51 instead of the NMOS transistor 31 and includes a depletion type NMOS transistor 53 and a protection circuit 60 instead of the NMOS transistor 32 with respect to the voltage detection circuit 30. Further, the voltage detection circuit 50 includes a depletion type NMOS transistor 52 and an enhancement type NMOS transistor 54.

The NMOS transistor 51 as an input transistor is connected in the same manner as the NMOS transistor 31, but a withstand voltage thereof is FET which is lower than the withstand voltage of the NMOS transistor 31 and is a relatively low withstand voltage. That is, the NMOS transistor 51 has a smaller area than that of the NMOS transistor 31. The NMOS transistor 51 is set to have a gate withstand voltage equal to or higher than a voltage applied to the gate, specifically a voltage of one cell or higher at least in a normal state in which no short-circuiting or grounding has occurred.

The NMOS transistor 52 which is an example of the FET is a so-called cascade transistor, and is connected from the viewpoint of ensuring a voltage VDS between the drain and the source of the NMOS transistor 51 to some extent. The NMOS transistor 52 includes a source as a first end connected to the drain of the NMOS transistor 51. A connection point between the source of the NMOS transistor 52 and the drain of the NMOS transistor 51 forms a node P2. Also, the NMOS transistor 52 as a second transistor includes a gate connected to the gate of the NMOS transistor 51 and a drain as a second terminal connected to an output port P3 of the voltage detection circuit 50. That is, the drain of the NMOS transistor 52 is connected to the level shifter 40 (more specifically, the gate of the PMOS transistor 41) of a circuit at the subsequent stage with respect to the voltage detection circuit 50.

A NMOS transistor 54 as a bypass transistor includes a gate connected to the gate of the NMOS transistor 51 and the gate of the NMOS transistor 52, a source connected to the gate of the NMOS transistor 51 and its own gate, a drain connected to the drain of the NMOS transistor 51 and the source of the NMOS transistor 52, and a back gate connected to the source of the NMOS transistor 51 and a power supply terminal 9. A connection point between the drain of the NMOS transistor 54, the drain of the NMOS transistor 51 and the source of the NMOS transistor 52 forms a node P2. Similarly to the NMOS transistor 51, the NMOS transistor 54 is FET which is lower than the withstand voltage of the NMOS transistor 31 and is a relatively low withstand voltage.

The NMOS transistor 53 as the first transistor includes a drain connected to a power supply terminal 8, a gate, and a source connected to its own gate, and operates as a constant current source. A connection point between the NMOS transistor 53 and the protection circuit 60 forms a node P1. Since the NMOS transistor 53 can be protected against the withstand voltage by the protection circuit 60, the FET which is a relatively low withstand voltage can be applied.

The protection circuit 60 includes, for example, PMOS transistors 61, 62, and 63 which are examples of FETs, and a constant current source 65.

The PMOS transistor 61 includes a source connected to the power supply terminal 8, a gate, and a drain connected to its own gate. The PMOS transistor 62 includes a source connected to the drain of the PMOS transistor 61, a gate, and a drain connected to its own gate. The PMOS transistor 63 includes a source connected to the gate and source of the NMOS transistor 53, a gate connected to the gate and drain of the PMOS transistor 62, and a drain connected to the drain of the NMOS transistor 52 and the gate of the PMOS transistor 41.

The constant current source 65 includes a first end connected to the gate and drain of the PMOS transistor 62 and the gate of the PMOS transistor 63, and a second end connected to the power supply terminal 9.

In the protection circuit 60, the two PMOS transistors 61 and 62 connected in cascade and the constant current source 65 which supplies a drain current to the PMOS transistors 61 and 62 constitutes a clamp circuit. The PMOS transistor 63 constitutes an output transistor of the protection circuit 60 of which the gate receives an output voltage from the clamp circuit. The PMOS transistors 61, 62, and 63 have a withstand voltage approximately equal to that of the NMOS transistor 32.

The overvoltage determination circuit 12 has a function of determining whether or not each of the cells $2\_1, \ldots, 2\_n$ has overvoltage based on an input voltage across both ends, and is configured to be able to determine whether or not each of the cells $2\_1, \ldots, 2\_n$ has overvoltage. The control circuit 15 is configured to be able to supply a control signal for switching between ON and OFF of the transistor to the charge control signal output port CO or the discharge control signal output port DO according to signals received from other circuits including circuits other than the overvoltage determination circuit 12 including at least one of an over-discharge detection circuit and an overcharge detection circuit (not illustrated).

Next, the operation of the voltage detection circuit 50 will be described by taking as an example a case in which the highest voltage is applied to the voltage detection circuit 50, specifically, a case in which the cell connection terminal VC(n−1) is short-circuited (shorted to the power supply terminal 8).

In the normal state before the cell connection terminal VC(n−1) is short-circuited, the NMOS transistors 51 and 54 are turned off. A voltage of node P2 is a voltage Vdd. A voltage at the output port P3 of the voltage detection circuit 50 corresponds to a signal indicating the voltage detection result, and is at the H level in the normal state.

When the cell connection terminal VC(n−1) is short-circuited, the voltage Vdd of the power supply terminal 8, that is, a voltage corresponding to the voltage of the secondary battery 2 is applied to the gate of the NMOS transistor 51. After the cell connection terminal VC(n−1) is short-circuited, the voltage of the gate of the NMOS transistor 51 gradually increases, and the voltage of the gate of the NMOS transistor 51 eventually exceeds a threshold voltage of the NMOS transistor 51. When the voltage of the gate of the NMOS transistor 51 exceeds the threshold voltage of the NMOS transistor 51, the NMOS transistor 51 is turned on and becomes conductive.

When the NMOS transistor 51 becomes conductive, the voltage of the node P2 drops to "the voltage of the gate of the NMOS transistor 51–the threshold voltage of the NMOS transistor 52." As the voltage of the node P2 drops, the voltage of the output port P3 also drops, and the level changes from the H level to the L level. In other words, a signal indicating that the short-circuiting of the cell connection terminal VC(n−1) has been detected is output to the level shifter 40 from the output port P3. The voltage at node P2 is higher than the voltage of the gate of the NMOS transistor 51 because the threshold voltage of the NMOS transistor 52 is negative. Even after the NMOS transistor 51 becomes conductive, the NMOS transistor 54 remains off until the voltage of the gate of the NMOS transistor 51 reaches a reference voltage Vref. While the NMOS transistor 54 is kept off, the voltage of the node P2 is kept higher than the voltage of the gate of the NMOS transistor 51.

Furthermore, when the voltage of the gate of the NMOS transistor 51 rises to become equal to or higher than the reference voltage Vref, the NMOS transistor 54 is turned on and becomes conductive. When the NMOS transistor 54 is turned on and becomes conductive, the voltage of the node P2 drops to "the voltage of the gate of the NMOS transistor 51–the threshold voltage of the NMOS transistor 51–the overdrive voltage of the NMOS transistor 51."

Here, the voltage of the node which is the same as the gate of the NMOS transistor 51 becomes equal to or higher than the voltage of the node P2 due to the relationship between the threshold voltage of the NMOS transistor 51 and an overdrive voltage. Thus, a bypass current flows through the NMOS transistor 54 from the drain to the source of the NMOS transistor 51 so that the voltage of the gate of the NMOS transistor 51 is clamped to the reference voltage Vref. As a result, the increase in the gate voltage of the NMOS transistor 51 is suppressed to near the reference voltage Vref.

The protection circuit 60 protects the NMOS transistor 53 from the overvoltage by clamping the voltage of the source of the NMOS transistor 53 operated as the constant current source, that is, the voltage of the node P1 to a predetermined voltage. The predetermined voltage is set in consideration of the voltage Vdd of the power supply terminal 8, the voltage between the source and the drain of the NMOS transistor 53 when becoming conductive, and the withstand voltage of the NMOS transistor 53. For example, when the PMOS transistors 61, 62 and 63 are all FETs having the same threshold voltage |Vthp|, the voltage of the node P1 is clamped to a voltage (Vdd−|Vthp|).

Signal processing at a subsequent stage with respect to the voltage detection circuit 50 is the same as that in the conventional charge and discharge control circuit 100, the charge and discharge control device including the charge and discharge control circuit 100, and the battery device. That is, in the example of FIG. 2, the overvoltage determination circuit 12 determines whether or not the cell 2_n has overvoltage based on the voltage received from the voltage detection circuit 50 via the level shifter 40, and transmits a signal corresponding to the determination result to the control circuit 15. The control circuit 15 supplies a control signal for switching between ON and OFF of the charge control FET 4 to the charge control signal output port CO and supplies a control signal for switching between ON and OFF of the discharge control FET 3 to the discharge control signal output port DO based on the signal corresponding to the received determination result.

According to the voltage detection circuit 50, the charge and discharge control circuit 10 including the voltage detection circuit 50, the charge and discharge control device 20, and the battery device 1, the input voltage to the NMOS transistor 51 including the gate to which the voltage received by the voltage detection circuit 50 is applied can be kept lower than in the conventional one. Since the input voltage to the NMOS transistor 51 can be kept lower than the conventional one, the withstand voltage of the NMOS transistor 51 can be kept lower than the withstand voltage of the NMOS transistor 31 of the voltage detection circuit 30 (refer to FIG. 1).

Also, the withstand voltages of the NMOS transistor 53 and the NMOS transistor 54 can be suppressed to the same level (the relatively low withstand voltage) as that of the NMOS transistor 51. Furthermore, the NMOS transistor 53 and the NMOS transistor 54 can have a sufficiently short channel length (an L length) (one to two orders of magnitude smaller) compared to the NMOS transistor 51 due to a difference in function from the NMOS transistor 51. On the other hand, although the NMOS transistor 52 and the PMOS transistors 61, 62, and 63 require a withstand voltage of the same level as those of the NMOS transistor 31 and the NMOS transistor 32, a channel length (an L length) can be made shorter (one to two orders of magnitude smaller) due to the difference in function.

Thus, although the voltage detection circuit 50 includes more elements than the voltage detection circuit 30, the area of each of the elements is smaller than that of each of the NMOS transistor 31 and the NMOS transistor 32, and in terms of the total area, the area of the voltage detection circuit 50 can be kept smaller than that of the voltage detection circuit 30. Also, although the area of each circuit of the voltage detection circuit 50 and the voltage detection circuit 30 increases, according to the voltage detection circuit 50, the charge and discharge control circuit 10 including the voltage detection circuit 50, the charge and discharge control device 20, and the battery device 1, even when the voltage of the secondary battery 2 is increased by increasing n which is the number of cells 2_1 to 2_n connected in series, an increase in the area of the voltage detection circuit 50 can be kept smaller than an increase in the area of the voltage detection circuit 30.

According to the voltage detection circuit 50, the charge and discharge control circuit 10 including the voltage detection circuit 50, the charge and discharge control device 20, and the battery device 1, since the input voltage of the NMOS transistor 51 can be kept lower than that of the conventional one (the constituent element of the comparator) and the NMOS transistor 31, positive bias temperature instability (PBTI) can be suppressed as compared with the conventional one and the NMOS transistor 31. Moreover, since the PBTI can be suppressed more than the conventional one, threshold voltage shift of the N type transistor can be suppressed, and detected voltage shift after a long-term reliability test can be suppressed more than the conventional one.

Moreover, since the voltage detection circuit 50 includes the NMOS transistor 52 connected in cascade with the NMOS transistor 51, the voltage VDS between the drain and the source of the NMOS transistor 51 can be kept constant. In other words, the voltage VDS between the drain and the source of the NMOS transistor 51 can be made independent of the voltage Vdd.

Although the voltage detection circuit 50 described above includes a clamp circuit in the protection circuit 60, the configuration is not limited thereto as long as the PMOS transistor 63 can receive a clamped voltage at the gate thereof. For example, when a clamp circuit is provided outside the voltage detection circuit 50, and an output voltage of the clamp circuit can be used, the PMOS transistor 63 including the gate to which the output voltage of the clamp circuit is applied may be used as the protection circuit 60.

Third Embodiment

Figure 4:
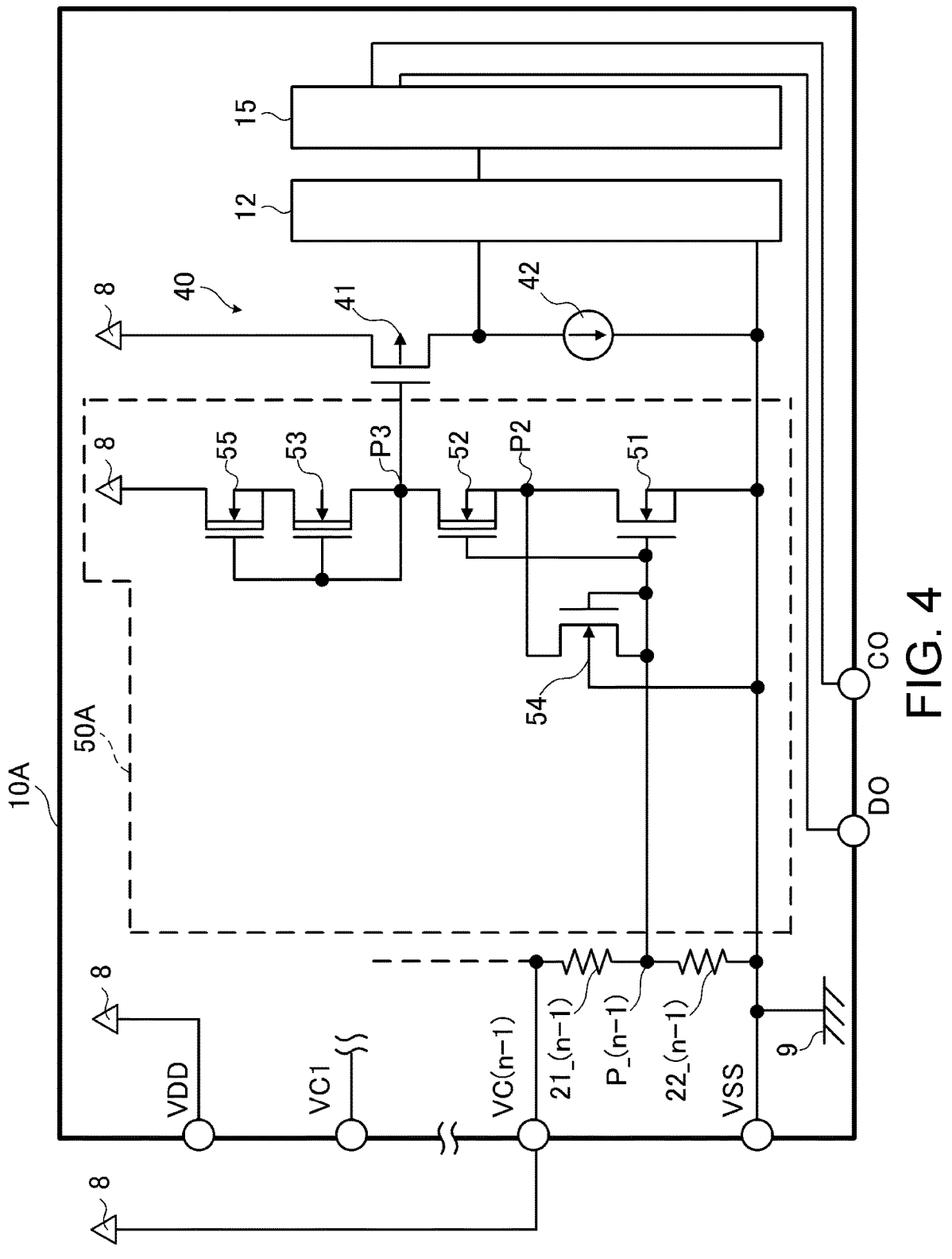
FIG. 4 is a circuit diagram schematically illustrating a main configuration of a voltage detection circuit according to a third embodiment of the present invention.

FIG. 4 is a circuit diagram schematically illustrating a main configuration of a voltage detection circuit 50A which is an example of a voltage detection circuit according to the third embodiment.

A semiconductor device, a charge and discharge control circuit, and a voltage detection circuit according to the third embodiment are different from the semiconductor device, charge and discharge control circuit, and voltage detection circuit according to the second embodiment in that the configuration of the voltage detection circuit is different, but there is no substantial difference in other respects. Thus, in the description of the present embodiment, the voltage detection circuit 50A which is different from the voltage detection circuit 50 will be mainly described, and other components which are substantially the same will be denoted by the same reference numerals, and redundant description will be omitted.

A charge and discharge control circuit 10A is different from the charge and discharge control circuit 10 in that it includes the voltage detection circuit 50A instead of the voltage detection circuit 50, but there is no substantial difference in other respects. The voltage detection circuit 50A is different from the voltage detection circuit 30 in that it includes an NMOS transistor 51 instead of the NMOS transistor 31 and it further includes an NMOS transistor 52, an NMOS transistor 53, and an NMOS transistor 54, but there is no substantial difference in other respects. Also, the voltage detection circuit 50A is different from the voltage detection circuit 50 in that it includes an NMOS transistor 55 instead of the protection circuit 60, but there is no substantial difference in other respects.

An NMOS transistor 55 which protects the NMOS transistor 53 from the overvoltage is connected between the drain of the NMOS transistor 53 in the voltage detection circuit 50A and the power supply terminal 8. That is, the NMOS transistor 55 as a third transistor is connected in cascade with the NMOS transistor 53 (more specifically, the gate and the source). The NMOS transistor 53 includes its own gate and source connected, and is also connected to the gate of the NMOS transistor 55, the drain of the NMOS transistor 52, and the gate of the PMOS transistor 41. The gate and source of the NMOS transistor 53 are an output port P3 in the voltage detection circuit 50A.

Next, an operation of the voltage detection circuit 50A will be described by taking as an example a case in which the highest voltage is applied to the voltage detection circuit 50A, specifically, a case in which the cell connection terminal VC(n−1) is short-circuited.

The voltage detection circuit 50A is different from the voltage detection circuit 50 in which the NMOS transistor 53 is protected against the withstand voltage by the protection circuit 60 in that the NMOS transistor 53 is protected against the withstand voltage by the NMOS transistor 55, but an overall circuit operation including the protection operation of the NMOS transistor 51 is substantially the same. The description of the circuit operation of the voltage detection circuit 50A will be omitted with the description of the circuit operation of the voltage detection circuit 50.

According to the voltage detection circuit, the charge and discharge control circuit, the charge and discharge control device, and the battery device according to the third embodiment, effects similar to those of the voltage detection circuit, the charge and discharge control circuit, the charge and discharge control device, and the battery device according to the second embodiment can be obtained.

In addition, since the voltage detection circuit 50A can further reduce the number of FETs having a relatively high withstand voltage compared to the voltage detection circuit 50, the circuit area can be further reduced. Thus, even when n which is the number of cells 2_1 to 2_$n$ connected in series is great, and the voltage of the secondary battery 2 is high, the increase in the area of the voltage detection circuit 50A can be kept smaller than the increase in the area of the voltage detection circuits 30 and 50.

The present invention is not limited to the above-described embodiments as they are, and in the implementation stage, it is possible to implement it in various forms other than the above-described embodiments, and various omissions, additions, replacements, or modifications can be made without departing from the scope of the present invention. Thus, some modified examples of the present invention will be described with reference to some examples.

First Modified Example

Figure 5:
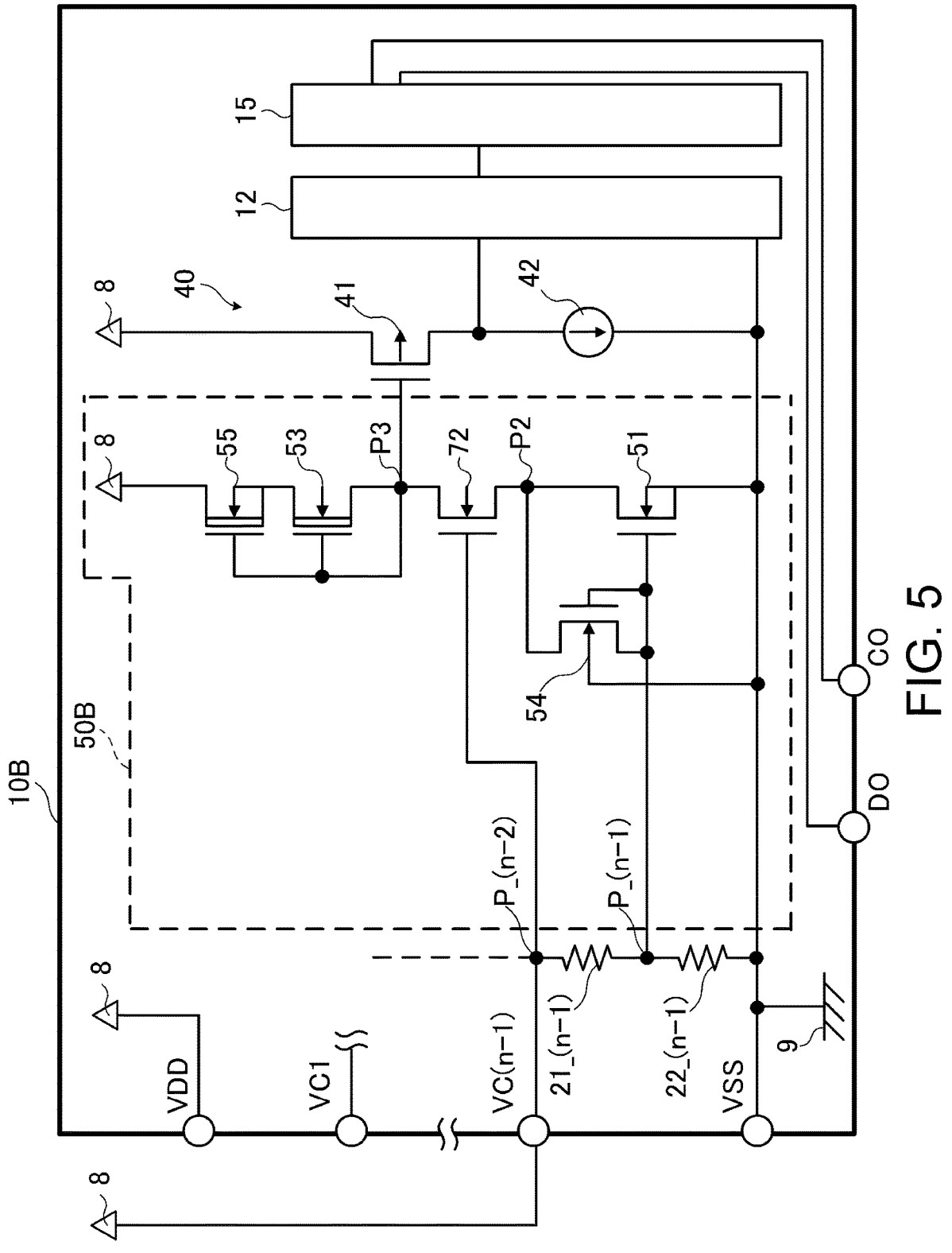
FIG. 5 is a circuit diagram schematically illustrating a main configuration of another configuration example (a first modified example) of the voltage detection circuit according to the embodiment.

FIG. 5 is a schematic diagram illustrating a configuration of a voltage detection circuit 50B which is another configuration example (a first modified example) of the voltage detection circuit according to the embodiment of the present invention.

The voltage detection circuit 50B is different from the voltage detection circuit 50A in that it includes an enhancement type NMOS transistor 72 instead of the depletion type NMOS transistor 52, but there is no substantial difference in other respects. Since the NMOS transistor 72 has a positive threshold voltage, the NMOS transistor 72 is different from the NMOS transistor 52 in that the gate is not connected to the connection point P_(n−1), but to a connection point having a higher voltage than the connection point P_(n−1), such as the connection point P_(n−2), but it is substantially the same as the NMOS transistor 52 in action and function.

The voltage detection circuit 50B configured in this way is operated in the same manner as the voltage detection circuit 50A and can obtain the same effects. Thus, in the voltage detection circuit, the charge and discharge control circuit including the voltage detection circuit, the charge and discharge control device, and the battery device according to the embodiment of the present invention, the voltage detection circuit 50B may be applied instead of the voltage detection circuit 50A. In short, even in the charge and discharge control circuit 10B, the charge and discharge control device 20, and the battery device 1 in which the voltage detection circuit 50A is replaced with the voltage detection circuit 50B, they act similarly to the charge and discharge control circuit 10A including the voltage detection circuit 50A, the charge and discharge control device 20, and the battery device 1, and can obtain the similar effects.

Second Modified Example

Figure 6:
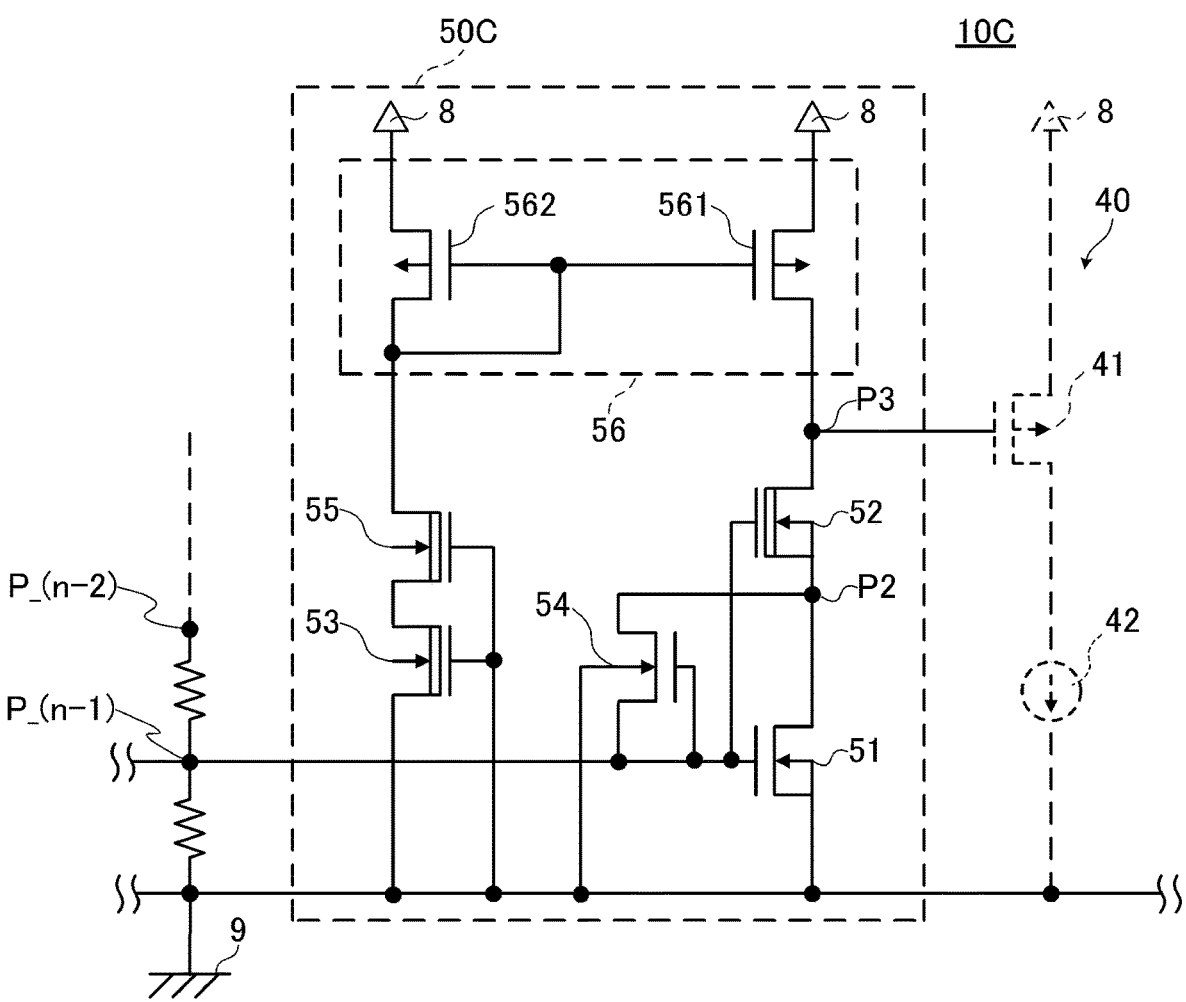
FIG. 6 is a circuit diagram schematically illustrating a main configuration of yet another configuration example (a second modified example) of the voltage detection circuit according to the embodiment.

FIG. 6 is a schematic diagram illustrating a configuration of a voltage detection circuit 50C which is yet another configuration example (a second modified example) of the voltage detection circuit according to the embodiment of the present invention.

Although the voltage detection circuit 50C is different from the voltage detection circuit 50A in that it further includes a current mirror circuit 56 including two PMOS transistors 561 and 562 and in an arrangement of the NMOS transistors 53 and 55, there is no substantial difference in other respects. Thus, in the description of the voltage detection circuit 50C, the components such as the NMOS transistor 51 which are substantially the same are denoted by the same reference numerals, and the description thereof will be omitted.

The voltage detection circuit 50C includes the NMOS transistor 55, the NMOS transistor 51, the NMOS transistor 52, the NMOS transistor 53, the NMOS transistor 54, and the current mirror circuit 56. In the current mirror circuit 56, the PMOS transistor 561 includes a source connected to the power supply terminal 8, a gate connected to the gate of the PMOS transistor 562, and a drain. Also, the PMOS transistor 562 includes a source connected to the power supply terminal 8, a gate connected to the gate of the PMOS transistor 561, and a drain connected to its own gate (the PMOS transistor 562). A current flowing through the drain of the PMOS transistor 561 is configured to be equal to a current through the drain of the PMOS transistor 562.

The drain of the PMOS transistor 561 is connected to the output port P3 and the drain of the NMOS transistor 52 in the voltage detection circuit 50C. On the other hand, the NMOS transistor 55 and the NMOS transistor 53 in the voltage detection circuit 50A are connected between the drain of the PMOS transistor 562 and the power supply terminal 9. Specifically, the source of the NMOS transistor 55 and the drain of the NMOS transistor 53 are connected. The gate of the NMOS transistor 53 is connected to the gate of the NMOS transistor 55 and the source of the NMOS transistor 53. A connection point between the gate of the NMOS transistor 55, the gate of the NMOS transistor 53, and the source of the NMOS transistor 53 is connected to the power supply terminal 9.

The voltage detection circuit 50C configured in this way is operated in the same manner as the voltage detection circuits 50A and 50B, and can obtain the same effects. In short, even in the charge and discharge control circuit 10C in which the voltage detection circuit 50A is replaced with the voltage detection circuit 50C, the charge and discharge control device 20, and the battery device 1, they act similarly to the charge and discharge control circuit 10A including the voltage detection circuit 50A, the charge and discharge control device 20, and the battery device 1, and can obtain the similar effects.

Third Modified Example

Figure 7:
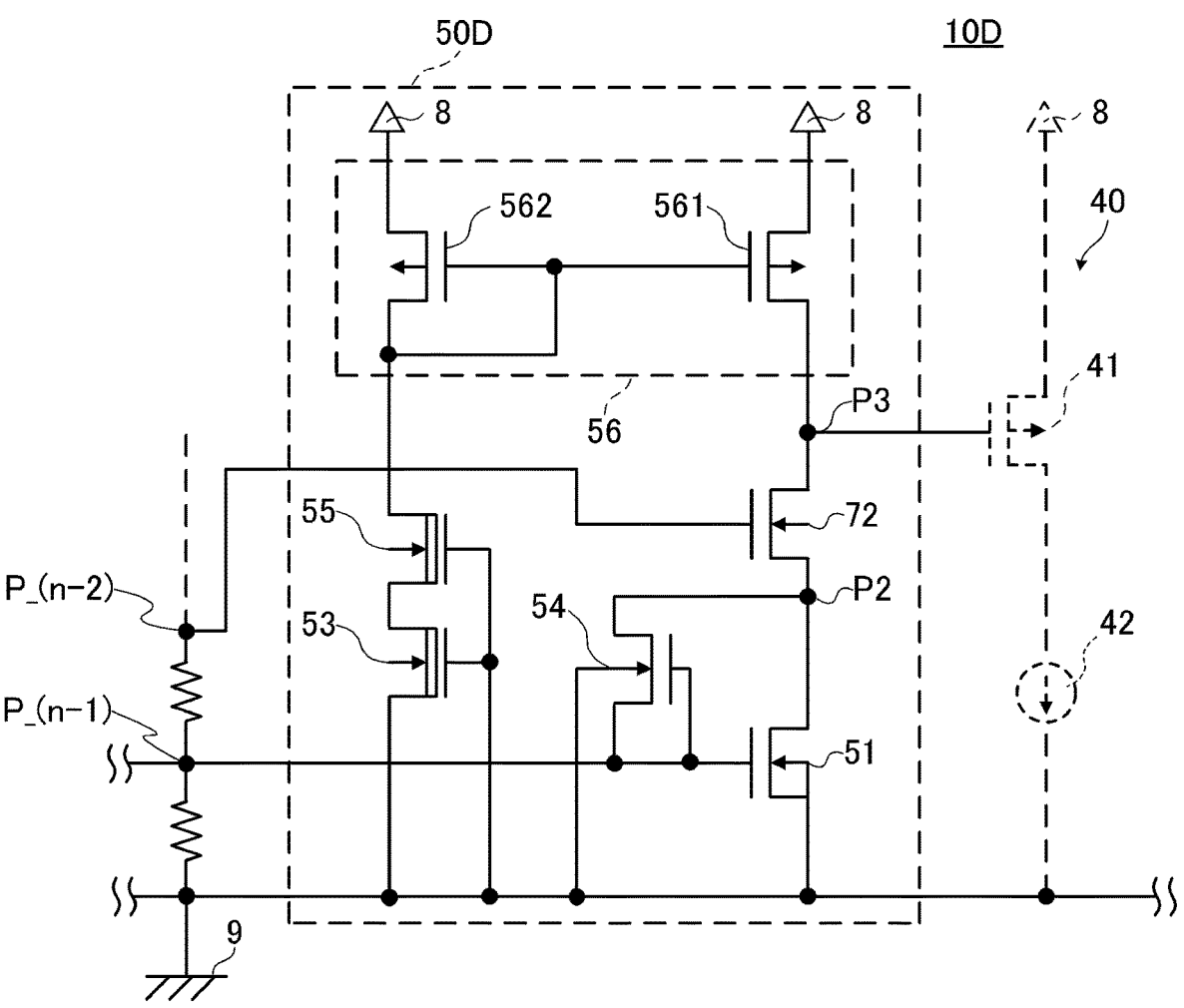
FIG. 7 is a circuit diagram schematically illustrating a main configuration of still another configuration example (a third modified example) of the voltage detection circuit according to the embodiment.

FIG. 7 is a schematic diagram illustrating a configuration of a voltage detection circuit 50D which is still another configuration example (a third modified example) of the voltage detection circuit according to the embodiment of the present invention.

The voltage detection circuit 50D is different from the voltage detection circuit 50C in that it includes an enhancement type NMOS transistor 72 instead of the depletion type NMOS transistor 52, but there is no substantial difference in other respects. In other words, the voltage detection circuit 50D is a circuit obtained by applying the modifications of the first modified example to the voltage detection circuit 50C.

The voltage detection circuit 50D configured in this way is operated in the same manner as the voltage detection circuits 50A, 50B, and 50C, and can obtain the same effects. In short, even in the charge and discharge control circuit 10D in which the voltage detection circuit 50A is replaced with the voltage detection circuit 50D, the charge and discharge control device 20, and the battery device 1, they act similarly to the charge and discharge control circuit 10A including the voltage detection circuit 50A, the charge and discharge control device 20, and the battery device 1, and can obtain the similar effects.

Fourth Modified Example

Figure 8:
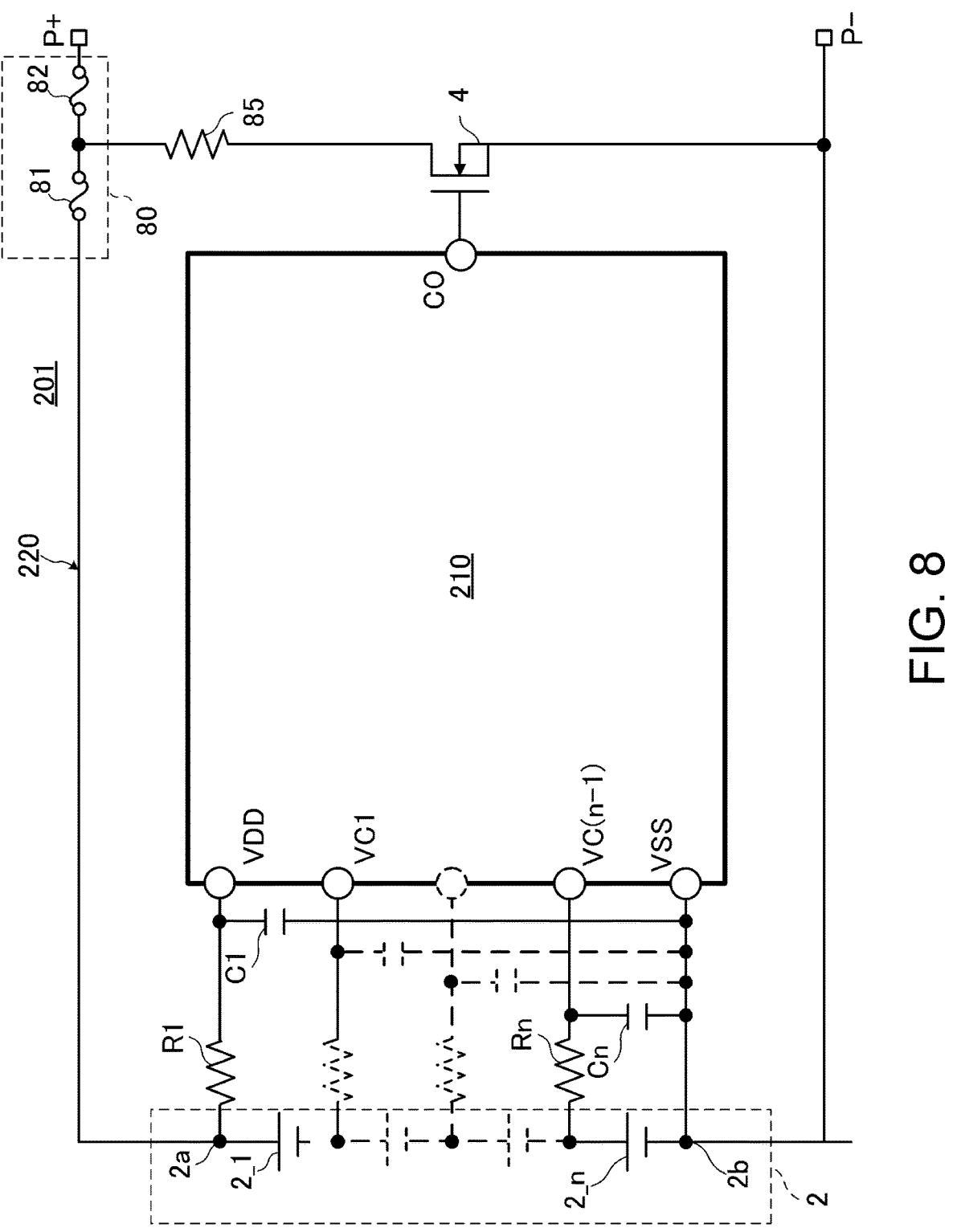
FIG. 8 is a schematic diagram illustrating a charge control circuit according to the embodiment and still another configuration example (a fourth modified example) of the semiconductor device according to the embodiment of the present invention.

FIG. 8 is a schematic diagram illustrating a configuration of a charge control circuit 210, a charge control device 220, and a battery device 201 which are still another configuration example (a fourth modified example) of the charge control circuit and the semiconductor device according to the embodiment of the present invention.

The charge control device 220 is a so-called fuse protection type charge control device, and includes an open circuit 80 including a fuse 81 and a fuse 82, and a charge control circuit 210. The fuse 81 and fuse 82 are connected in series with each other. Specifically, one end of the fuse 82 is connected to a P+ terminal. The other end of fuse 82 is connected to one end of fuse 81. The other end of the fuse 81 is connected to a positive pole of the first cell 2_1. The charge control circuit 210 is a circuit in which the discharge control terminal DO and a signal path connected to discharge control terminal DO are omitted from the charge and discharge control circuit 100 (refer to FIG. 2), and is a circuit in which there is no substantial difference in other respects.

The charge control FET 4 is, for example, an N-channel field effect transistor including a gate, a source and a drain. The gate is connected to a CO terminal of the charge control circuit 210. The source is connected to a P− terminal. The drain is connected to one end of resistor 85. The charge control FET 4 controls ON and OFF between a source terminal and a drain terminal based on a signal output from the CO terminal. The other end of the resistor 85 is connected to a connection portion between the fuse 81 and the fuse 82. The resistor 85 functions as a heater element which fuses the fuses 81 and 82 when the charge control FET 4 is turned on.

As in the charge control device 220 and the battery device 201 described above, a semiconductor device having a configuration different from that of the charge and discharge control device 20 and the battery device 1 may be employed as the semiconductor device according to the embodiment of the present invention. According to the charge control circuit 210, the charge control device 220 and the battery device 201, the same effects as those in the charge and discharge control circuit 10, the charge and discharge control device 20 and the battery device 1 can be obtained.

The above-described MOS transistor is illustrated as an example of the FET, and any type of FET is acceptable. For example, A type of FET different from a MOSFET, such as a junction FET (JFET) or a metal insulator semiconductor FET (MISFET), may be applied.

The embodiments and their modifications are included in the scope and gist of the present invention, and are included in the scope of the present invention described in the claims and equivalents thereof.

What is claimed is:

1. A voltage detection circuit comprising:
an input port;
a plurality of transistors connected in series and including at least an input transistor including a gate connected to the input port, a source connected to a first power supply terminal, and a drain, and a first transistor including a drain connected to a second power supply terminal, a gate, and a source connected to the gate of the first transistor; and
an output port configured to be one of connection points of the plurality of transistors.

2. The voltage detection circuit according to claim 1, wherein the plurality of transistors further includes:
a bypass transistor including a gate connected to the gate of the input transistor, a drain connected to the drain of the input transistor, a source connected to the gate of the input transistor and the gate of the bypass transistor, and a back gate connected to the first power supply terminal;
a second transistor including a first end connected to the input transistor and a second end connected to an output port configured to output a signal which indicates a voltage detection result; and
a third transistor connected in cascade with the first transistor.

3. The voltage detection circuit according to claim 2, wherein the third transistor is a depletion type transistor including a drain connected to the second power supply terminal, a gate connected to the gate and source of the first transistor, and a source connected to the drain of the first transistor.

4. A charge control circuit comprising:
the voltage detection circuit according to claim 3;
a first power supply input port and a second power supply input port;
a charge control signal output port connected to a gate of a charge control FET for controlling charge of a secondary battery including a battery pack in which a plurality of battery cells are connected in series;
an overvoltage determination circuit configured to determine whether or not the secondary battery has overvoltage based on a voltage output from the voltage detection circuit; and
a control circuit configured to supply a control signal for switching between ON and OFF of the charge control FET to the charge control signal output port according to a signal received from another circuit including the overvoltage determination circuit.

5. A charge and discharge control circuit comprising:
the voltage detection circuit according to claim 3;
a first power supply input port and a second power supply input port;
a charge control signal output port connected to a gate of a charge control FET for controlling charge of a secondary battery including a battery pack in which a plurality of battery cells are connected in series;
a discharge control signal output port connected to a gate of a discharge control FET for controlling discharge of the secondary battery;
an external negative voltage input port which receives a voltage of an external negative terminal, of an external positive terminal and the external negative terminal to which either one of a charger for charging the secondary battery and a load for discharging the secondary battery is connected;
an overvoltage determination circuit configured to determine whether or not the secondary battery has overvoltage based on a voltage output from the voltage detection circuit; and
a control circuit configured to supply, according to a signal received from another circuit including the overvoltage determination circuit, a control signal for switching between ON and OFF of the charge control FET to the charge control signal output port, and supply a control signal for switching between ON and OFF of the discharge control FET to the discharge control signal output port.

6. A semiconductor device comprising:
the charge and discharge control circuit according to claim 5;
the external positive terminal and the external negative terminal;
the discharge control FET in which a drain and a source are connected in series with a path which connects the external positive terminal and the external negative terminal, and a gate is connected to the discharge control signal output port; and
the charge control FET in which a drain and a source are connected in series with the path which connects the external positive terminal and the external negative terminal, and a gate is connected to the charge control signal output port.

7. The voltage detection circuit according to claim 2, wherein the third transistor is an enhancement type transistor including a source connected to the gate and source of the first transistor, a drain connected to the second end of the second transistor, and a gate.

8. A charge control circuit comprising:
the voltage detection circuit according to claim 7;
a first power supply input port and a second power supply input port;
a charge control signal output port connected to a gate of a charge control FET for controlling charge of a secondary battery including a battery pack in which a plurality of battery cells are connected in series;
an overvoltage determination circuit configured to determine whether or not the secondary battery has overvoltage based on a voltage output from the voltage detection circuit; and
a control circuit configured to supply a control signal for switching between ON and OFF of the charge control FET to the charge control signal output port according to a signal received from another circuit including the overvoltage determination circuit.

9. A charge and discharge control circuit comprising:

the voltage detection circuit according to claim 7;

a first power supply input port and a second power supply input port;

a charge control signal output port connected to a gate of a charge control FET for controlling charge of a secondary battery including a battery pack in which a plurality of battery cells are connected in series;

a discharge control signal output port connected to a gate of a discharge control FET for controlling discharge of the secondary battery;

an external negative voltage input port which receives a voltage of an external negative terminal, of an external positive terminal and the external negative terminal to which either one of a charger for charging the secondary battery and a load for discharging the secondary battery is connected;

an overvoltage determination circuit configured to determine whether or not the secondary battery has overvoltage based on a voltage output from the voltage detection circuit; and a control circuit configured to supply, according to a signal received from another circuit including the overvoltage determination circuit, a control signal for switching between ON and OFF of the charge control FET to the charge control signal output port, and supply a control signal for switching between ON and OFF of the discharge control FET to the discharge control signal output port.

10. A semiconductor device comprising:

the charge and discharge control circuit according to claim 9;

the external positive terminal and the external negative terminal;

the discharge control FET in which a drain and a source are connected in series with a path which connects the external positive terminal and the external negative terminal, and a gate is connected to the discharge control signal output port; and the charge control FET in which a drain and a source are connected in series with the path which connects the external positive terminal and the external negative terminal, and a gate is connected to the charge control signal output port.

11. A charge control circuit comprising:

the voltage detection circuit according to claim 2;

a first power supply input port and a second power supply input port;

a charge control signal output port connected to a gate of a charge control FET for controlling charge of a secondary battery including a battery pack in which a plurality of battery cells are connected in series;

an overvoltage determination circuit configured to determine whether or not the secondary battery has an overvoltage based on a voltage output from the voltage detection circuit; and a control circuit configured to supply a control signal for switching between ON and OFF of the charge control FET to the charge control signal output port according to a signal received from another circuit including the overvoltage determination circuit.

12. A charge and discharge control circuit comprising:

the voltage detection circuit according to claim 2;

a first power supply input port and a second power supply input port;

a charge control signal output port connected to a gate of a charge control FET for controlling charge of a secondary battery including a battery pack in which a plurality of battery cells are connected in series;

a discharge control signal output port connected to a gate of a discharge control FET for controlling discharge of the secondary battery;

an external negative voltage input port which receives a voltage of an external negative terminal, of an external positive terminal and the external negative terminal to which either one of a charger for charging the secondary battery and a load for discharging the secondary battery is connected;

an overvoltage determination circuit configured to determine whether or not the secondary battery has overvoltage based on a voltage output from the voltage detection circuit; and a control circuit configured to supply, according to a signal received from another circuit including the overvoltage determination circuit, a control signal for switching between ON and OFF of the charge control FET to the charge control signal output port, and supply a control signal for switching between ON and OFF of the discharge control FET to the discharge control signal output port.

13. A semiconductor device comprising:

the charge and discharge control circuit according to claim 12;

the external positive terminal and the external negative terminal;

the discharge control FET in which a drain and a source are connected in series with a path which connects the external positive terminal and the external negative terminal, and a gate is connected to the discharge control signal output port; and the charge control FET in which a drain and a source are connected in series with the path which connects the external positive terminal and the external negative terminal, and a gate is connected to the charge control signal output port.

14. A charge control circuit comprising:

the voltage detection circuit according to claim 1;

a first power supply input port and a second power supply input port;

a charge control signal output port connected to a gate of a charge control FET for controlling charge of a secondary battery including a battery pack in which a plurality of battery cells are connected in series;

an overvoltage determination circuit configured to determine whether or not the secondary battery has an overvoltage based on a voltage output from the voltage detection circuit; and a control circuit configured to supply a control signal for switching between ON and OFF of the charge control FET to the charge control signal output port according to a signal received from another circuit including the overvoltage determination circuit.

15. A semiconductor device comprising:

the charge control circuit according to claim 14;

an external positive terminal and an external negative terminal to which either one of a charger for charging the secondary battery and a load for discharging the secondary battery is connected;

the charge control FET comprising a gate connected to the charge control signal output port; and an open circuit including a fuse connected to the charge control FET.

16. The semiconductor device according to claim 15, further comprising the secondary battery.

17. A charge and discharge control circuit comprising:

the voltage detection circuit according to claim 1;

a first power supply input port and a second power supply input port;

a charge control signal output port connected to a gate of a charge control FET for controlling charge of a secondary battery including a battery pack in which a plurality of battery cells are connected in series;

a discharge control signal output port connected to a gate of a discharge control FET for controlling discharge of the secondary battery;

an external negative voltage input port which receives a voltage of an external negative terminal, of an external positive terminal and the external negative terminal to which either one of a charger for charging the secondary battery and a load for discharging the secondary battery is connected;

an overvoltage determination circuit configured to determine whether or not the secondary battery has overvoltage based on a voltage output from the voltage detection circuit; and a control circuit configured to supply, according to a signal received from another circuit including the over-voltage determination circuit, a control signal for switching between ON and OFF of the charge control FET to the charge control signal output port, and supply a control signal for switching between ON and OFF of the discharge control FET to the discharge control signal output port.

18. A semiconductor device comprising:

the charge and discharge control circuit according to claim 17;

the external positive terminal and the external negative terminal;

the discharge control FET in which a drain and a source are connected in series with a path which connects the external positive terminal and the external negative terminal, and a gate is connected to the discharge control signal output port; and the charge control FET in which a drain and a source are connected in series with the path which connects the external positive terminal and the external negative terminal, and a gate is connected to the charge control signal output port.

19. The semiconductor device according to claim 18, further comprising the secondary battery.

* * * * *